No. 894,952. PATENTED AUG. 4, 1908.
A. B. HERRICK.
RAIL BOND.
APPLICATION FILED NOV. 25, 1904. RENEWED OCT. 9, 1907.
Fig. 1. Fig. 2.
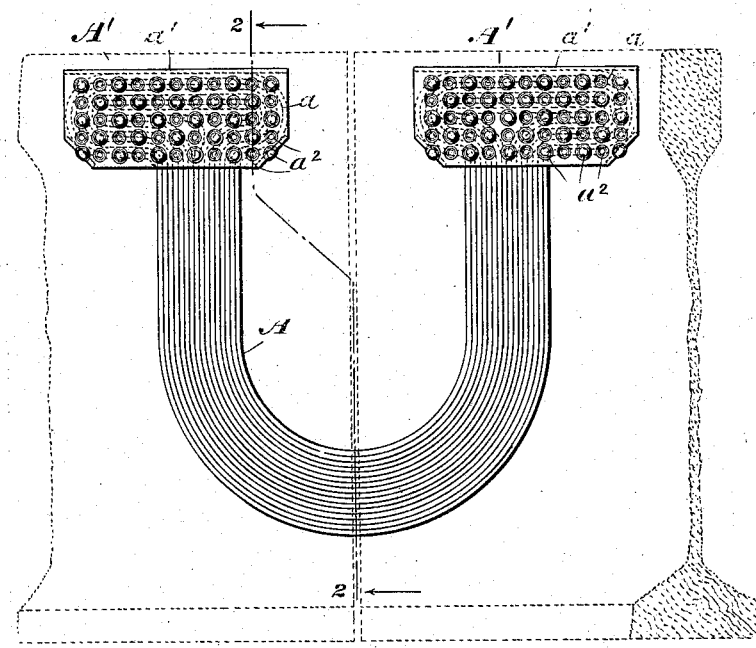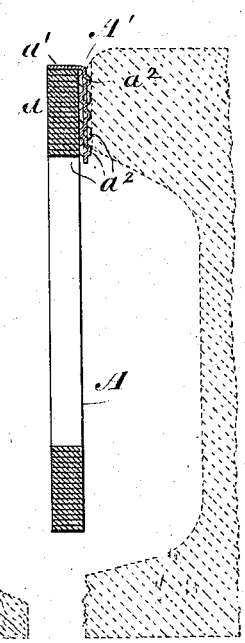
Fig. 3. Fig. 4.
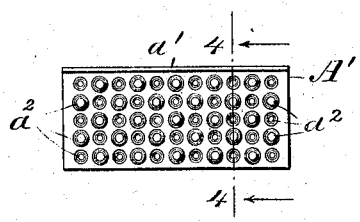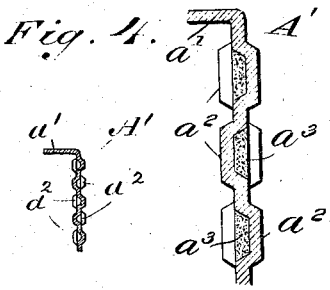
Fig. 5.
WITNESSES: INVENTOR:
A. E. Merkel. Albert B. Herrick
C. M. Norling. by his attorney
J. B. Fay.

UNITED STATES PATENT OFFICE.

ALBERT B. HERRICK, OF CLEVELAND, OHIO, ASSIGNOR TO THE ELECTRIC RAILWAY IMPROVEMENT COMPANY, OF CLEVELAND, OHIO, A CORPORATION OF OHIO.

RAIL-BOND.

No. 894,952.  Specification of Letters Patent.  Patented Aug. 4, 1908.

Application filed November 25, 1904, Serial No. 234,164. Renewed October 9, 1907. Serial No. 396,658.

*To all whom it may concern:*

Be it known that I, ALBERT B. HERRICK, a citizen of the United States, resident of Cleveland, county of Cuyahoga, and State of Ohio, have invented a new and useful Improvement in Rail-Bonds, of which the following is a specification, the principle of the invention being herein explained and the best mode in which I have contemplated applying that principle, so as to distinguish it from other inventions.

My invention relates to devices for bonding abutting rails of electric railways, its object being to provide a bond which may be efficiently attached to said rails and which is economical in its construction.

The bond embodying my invention is particularly adapted for use in connection with the electrical process of bonding rails by brazing or soldering, described and claimed in an application for U. S. Letters Patent filed even date herewith. The said invention in bonds is hereinafter fully described and particularly set forth in the claims.

The annexed drawing and the following description set forth in detail certain means embodying the invention, such disclosed means constituting but one of various mechanical forms in which the principle of the invention may be used.

In said annexed drawing:—Figure 1 represents a front elevation of a bond embodying my invention, the ends of the two abutting rails to which it is attached being shown in dotted lines. Fig. 2 represents a section of said bond taken upon the plane indicated by line 2—2, Fig. 1. Fig. 3 represents a front elevation of the sheet of brazing or soldering material forming part of the complete bond. Fig. 4 represents a section of said brazing material taken upon the line 4—4, Fig. 3. Fig. 5 illustrates the utilization of the form of such brazing material to retain a flux where such flux is used to increase the fusibility of the parts.

The bond embodying my invention consists of a main conducting element A formed of laminations of copper, as shown and having two terminal parts $a$, $a$. These terminal parts extend laterally as shown in dotted lines in Fig. 1, so as to present the required amount of contact surface. Upon each terminal part is secured a solder or braze portion A'. Each of these portions consists of a rectangular sheet of suitable metal such as brass, provided with an upper flange $a'$, as shown in Figs. 3 and 4. The main portion of the sheet is provided with a series of oppositely directed indentations $a^2$, alternately arranged as shown, so as to form a series of protuberances projecting from opposite sides of the braze portions. This braze portion is placed upon the terminal part so as to cause the flange $a'$ to rest upon the upper surface of the latter, as shown in Fig. 2. In this position the braze is secured to the terminal part by turning under the lower corners so as to engage the bond, as shown in Fig. 1.

As fully described in the above mentioned co-pending application on a method of bonding, the indented character of the brazing is imparted thereto for the purpose of reducing the conducting contact surface and thereby increasing the electrical resistance of the parts when used in connection with the said method. These indentations also provide a convenient medium for holding a flux where such flux is used to increase the fusibility of the parts when subjected to the electrically generated heat. In such case, the indentations readily receive and retain such flux, designated by letter $a^3$, Fig. 5, and efficiently prevent the detachment thereof from the braze portion. This flux is usually applied in a liquid or semi-liquid condition and then permitted to dry out whereby it is left in a solid condition in the indentation.

Inasmuch as the particular constitution of the sheets A' will depend upon various considerations, not merely in the matter of results obtained but of expediency and convenience in use, it will be understood that I herein use the terms solder and braze indifferently, meaning thereby any suitable material or composition that will serve to unite the metal of the bond with that of the rail. As a general term applying to either solder or braze, I shall accordingly use the phrase cementing material.

Other modes of applying the principle of my invention may be employed instead of the one explained, change being made as regards the means herein disclosed, provided the means stated by any one of the following claims or the equivalent of such stated means be employed.

I therefore particularly point out and distinctly claim as my invention:—

1. A rail-bond comprising a main conducting element having laterally extending terminal parts, and sheets of cementing material, each such sheet being formed with an upper flange-portion resting upon the end surface of the respective terminal part and having its lower edge bent under the laterally extending portion of such part whereby such sheet is held in place upon said terminal part.

2. A rail-bond comprising a conducting element, and sheets of cementing material attached to the respective terminal portions of said element, said sheets having their outer faces formed with projecting protuberances, whereby the contacting area of such faces is decreased.

3. A rail-bond comprising a conducting element, and sheets of cementing material attached to the respective terminal portions of said element, said sheets being of undulate cross-section, whereby outwardly projecting protuberances are formed.

4. A rail-bond comprising a conducting element, and sheets of cementing material attached to the respective terminal portions of said element, said sheets being provided with oppositely directed indentations alternately arranged to form protuberances projecting from their opposite sides.

5. A rail-bond comprising a main conducting element having laterally extending terminal parts, and sheets of cementing material having their outer and inner surfaces of undulate cross-section, whereby outwardly projecting protuberances are formed.

6. A rail-bond comprising a main conducting element having laterally extending terminal parts, and sheets of cementing material for each such part, each such sheet having an outer contact face of less area than its outer face and an inner face only in partial contact with the corresponding terminal part, each such sheet being formed with an upper flange-portion resting upon the end surface of the corresponding terminal part and having its lower edge bent under the laterally extending portion of such part whereby such sheet is held in place upon said terminal part.

7. A rail-bond comprising a main conducting element having laterally extending terminal parts, and sheets of cementing material formed with inwardly and outwardly projecting protuberances, each such sheet being formed with an upper flange-portion resting upon the end surface of the respective terminal part and having its lower edge bent under the laterally extending portion of such part whereby such sheet is held in place upon said terminal part.

8. As a new article of manufacture, a rail-bond comprising a main conducting element, sheets of cementing material attached to the respective terminal portions thereof, said sheets having their outer faces formed with projecting protuberances, and a flux deposited in the indentations intermediate between such protuberances.

9. As a new article of manufacture, a rail-bond comprising a main conducting element, sheets of cementing material attached to the respective terminal portions thereof, said sheets being of undulate cross-section, and a flux deposited in the indentations thus provided in said sheets.

10. As a new article of manufacture, a rail-bond comprising a main conducting element, sheets of cementing material attached to the respective terminal portions thereof, said sheets being formed with inwardly and outwardly projecting protuberances, and a flux deposited in the indentations thus provided.

11. As a new article of manufacture, a rail-bond comprising a main conducting element having laterally extending terminal parts, sheets of cementing material attached to such terminal parts, respectively, each sheet being formed with an upper flange-portion resting upon the end surface of the corresponding terminal part and having its lower edge bent under the laterally extending portion of such part whereby said sheet is held in place thereon, said sheet being furthermore formed with inwardly and outwardly projecting protuberances, and a flux deposited in a liquid, or semi-liquid, condition in the indentations thus formed.

12. As a new article of manufacture, a rail-bond comprising a main conducting element, sheets of cementing material attached to the respective terminal portions thereof, said sheets being provided with oppositely directed indentations alternately arranged to form protuberances projecting from their opposite sides, and a flux deposited in a liquid, or semi-liquid, condition in the indentations thus formed.

Signed by me, this 21st day of November 1904.

ALBERT B. HERRICK

Attested by:
E. M. NOELING,
A. E. MERKEL.